United States Patent [19]

Agius

[11] Patent Number: 5,443,608

[45] Date of Patent: Aug. 22, 1995

[54] MODULAR INSTALLATION FOR CURVING AND TEMPERING A GLASS SHEET

[75] Inventor: Michel Agius, Santeuil, France

[73] Assignee: Selas S.A., Gennevilliers, France

[21] Appl. No.: 229,832

[22] Filed: Apr. 19, 1994

[30] Foreign Application Priority Data

May 5, 1993 [FR] France ................. 93 05359

[51] Int. Cl.⁶ ............................................. C03B 23/03
[52] U.S. Cl. .................................... 65/268; 65/273;
65/290; 65/291
[58] Field of Search ............... 65/104, 106, 268, 273,
65/290, 291

[56] References Cited

U.S. PATENT DOCUMENTS

| | | | |
|---|---|---|---|
| 3,682,613 | 8/1972 | Johnson et al. | 65/291 |
| 4,470,835 | 9/1984 | Fecik et al. | 65/106 |
| 4,720,296 | 1/1988 | Bartusel et al. | 65/290 |
| 4,741,751 | 5/1988 | Claassen et al. | 65/106 |
| 4,976,762 | 12/1990 | Anttonen . | |

FOREIGN PATENT DOCUMENTS

| | | |
|---|---|---|
| 389323 | 9/1990 | European Pat. Off. . |
| 440884 | 8/1991 | European Pat. Off. . |
| WO85/03068 | 7/1985 | WIPO . |
| WO90/15781 | 12/1990 | WIPO . |
| WO93/00305 | 1/1993 | WIPO . |

*Primary Examiner*—W. Gary Jones
*Assistant Examiner*—Steven P. Griffin
*Attorney, Agent, or Firm*—Young & Thompson

[57] ABSTRACT

The installation for curving and tempering a glass sheet (1) comprises a first series (3) of shaping members (20) exhibiting a surface (3a) intended to come into contact with one of the faces of the glass sheet (1) and a second series (4) of members including a central surface portion (5) to which at least one movable part (6, 7) is attached. First adjustment devices (10, 11, 12) enable the profile of the surface (3a) of the first series (3) of members (20) to be modified, jacks (8) control the movement of the movable part (6, 7) of the second series (4) of members in a curve parallel to the profile of the surface (3a) of the first series (3) of members (20), and second adjustment devices are suitable for modifying the profile of the central surface portion (5) of the second series of members (4).

19 Claims, 5 Drawing Sheets

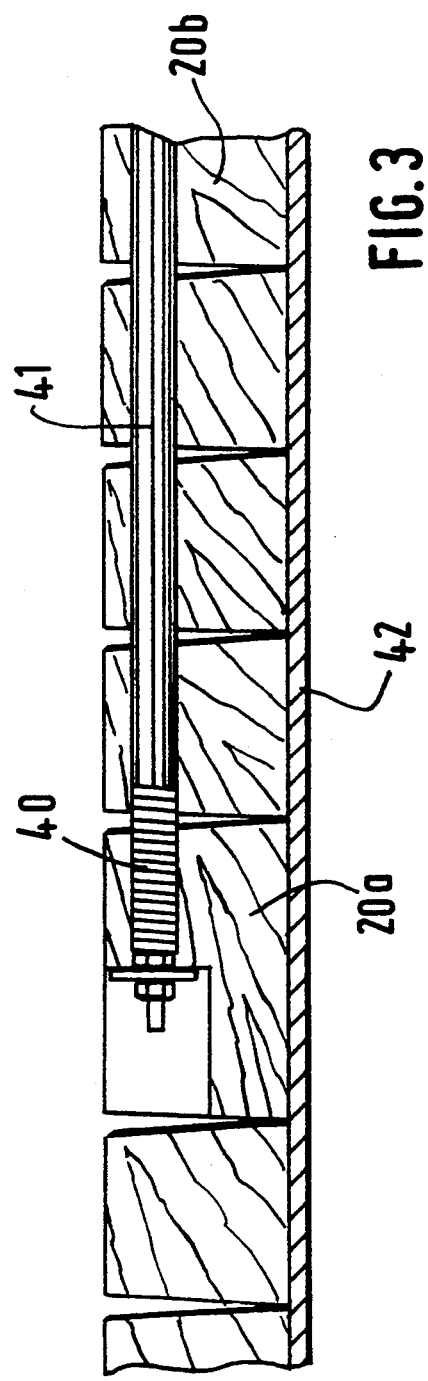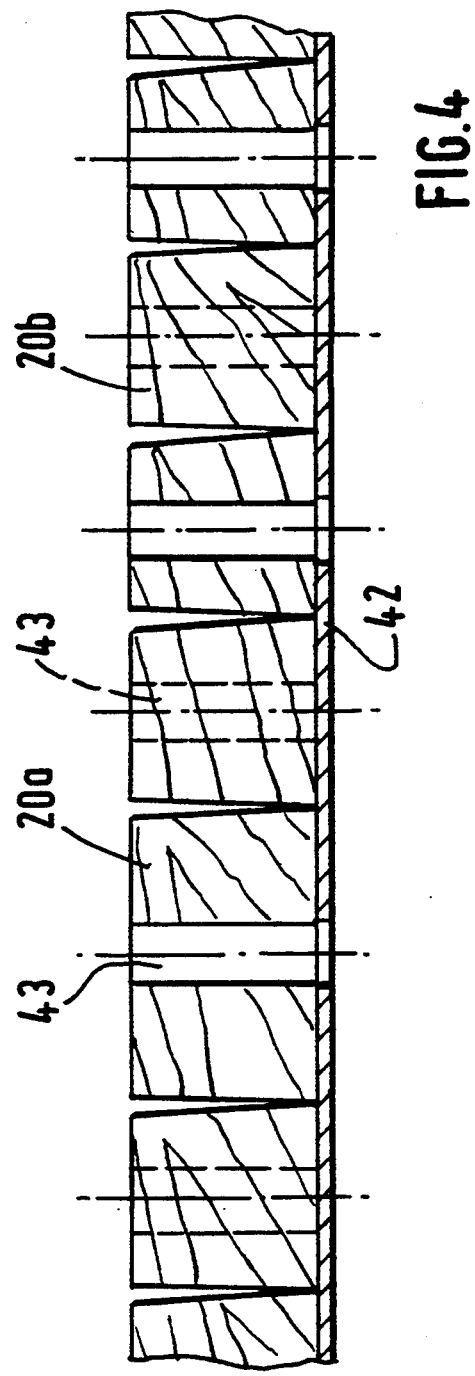

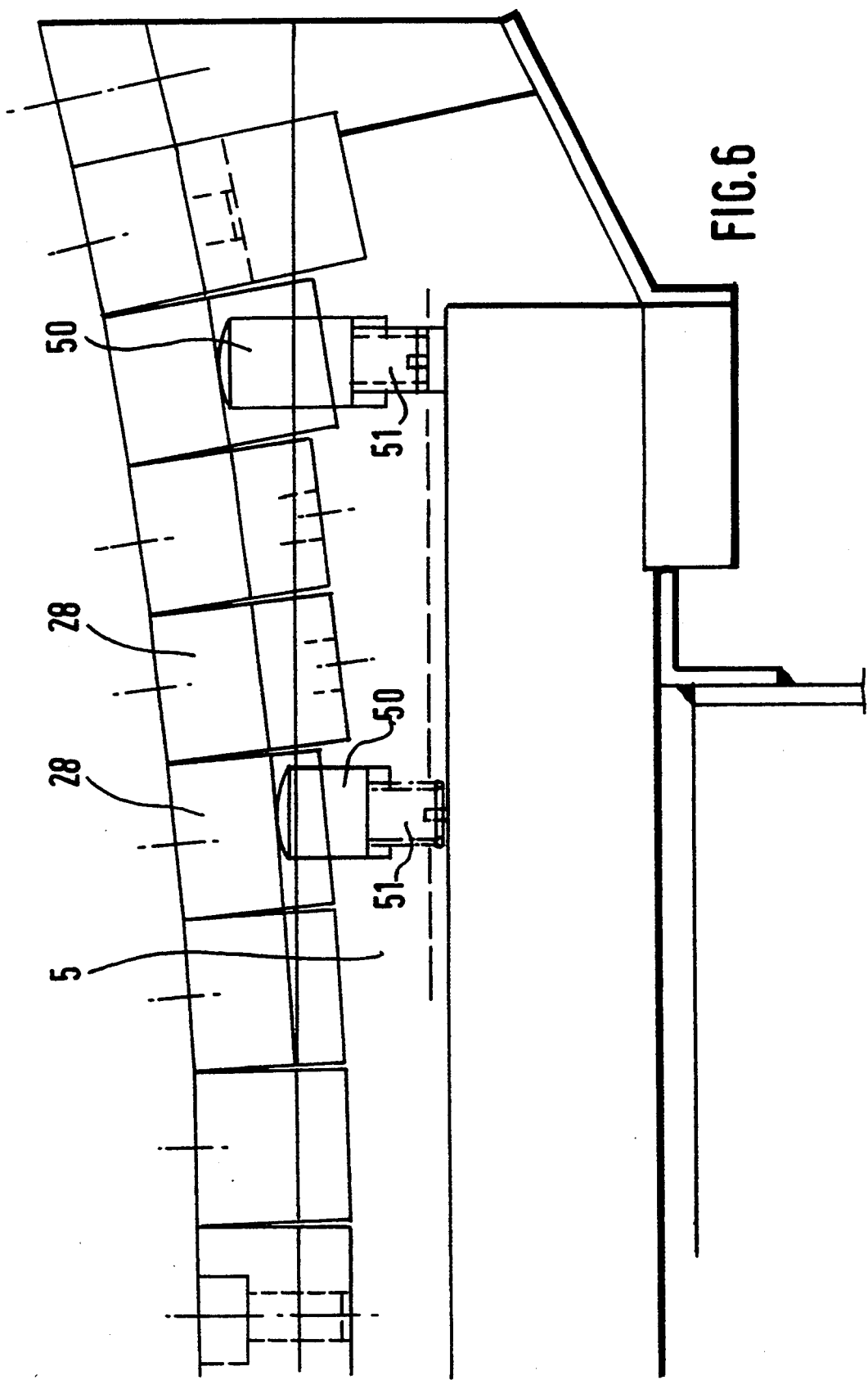

MODULAR INSTALLATION FOR CURVING AND TEMPERING A GLASS SHEET

FIELD OF THE INVENTION

The present invention relates to a modular installation for curving and tempering a glass sheet.

THE KNOWN PRIOR ART

Installations for rendering glass convex are known, such as those described in French Patent Application 89 03760, in which the glass sheet is positioned horizontally between two shaping members which are applied respectively to each face of the glass sheet. One of the members has a predetermined profile which corresponds to the curvature which it is desired to give the glass sheet.

The other member possesses a rigid central part, the profile of which corresponds to the profile of the first member located opposite and two movable parts which are attached to the central part and are moved in a curve parallel to the predetermined profile of the first member.

Jets of gas are directed onto the curved glass sheet so as to temper the latter.

Such installations enable a glass sheet to be curved with a predetermined profile, while still preserving good optical quality of the glass.

Increasingly, curved glass sheets are used in varied applications (car windshield, refrigerated gondola, telephone booth, etc.) and various profiles are desired.

The known installations require, in order to modify the convexity profile of the glass sheets, to change all or part of the shaping members, which necessitates dismantling these members and creating as many substitutable pieces as different profiles.

Such installations therefore allow, in practice, only the production of a strictly limited number of predetermined profiles.

OBJECTS OF THE INVENTION

The object of the present invention is to overcome the aforementioned drawbacks. It makes it possible, especially, to provide a modular installation which enables a glass sheet to be rendered convex according to the most varied profiles.

SUMMARY OF THE INVENTION

The modular installation for curving and tempering a glass sheet addressed by the invention, comprises means for positioning the heated glass sheet horizontally between members for shaping the glass sheet, means for applying these members on either side of this sheet and for curving the latter and means for directing jets of gas onto the glass sheet in order to temper the latter. The shaping members include a first series of members exhibiting a surface intended to come into contact with one of the faces of the glass sheet and a second series of members exhibiting a surface intended to come into contact with the other face of the glass sheet, including a central surface portion to which at least one movable part is attached.

According to the invention, the installation is one which comprises first adjustment means for modifying the profile of said surface exhibited by the first series of members as a function of the curvature which it is desired to give the glass sheet, means for controlling the movement of the movable part of the second series of members in a curve parallel to the profile of the surface of the first series of members and second adjustment means suitable for modifying the profile of said central surface portion of the second series of members as a function of the profile of the surface of said first series of members which is located opposite.

Thus, any profile may be produced by the shaping members and the glass sheet may be convex with varied angles of curvature.

By virtue of the adjustment means, it suffices to modify the profile of the first series of members and of the central surface portion of the second series of members; while rendering the glass sheet convex, it is pressed between these two surfaces and the movable parts of the second series of members apply, by rolling, the glass sheet against the surface of the first series of members.

By virtue of the movable parts, the glass sheet is curved without slipping with respect to the shaping members, which avoids marking and deforming the surface of the glass sheet.

According to an advantageous version of the invention, the members of the first series consist of blocks of trapezoidal cross section, the base of said blocks being intended to be applied to the surface of the glass sheet.

Thus, by virtue of the trapezium shape of these blocks, it is possible, by tightening up the adjacent blocks towards each other to a greater or lesser extent, to easily modify the curvature of the profile of the shaping members.

BRIEF DESCRIPTION OF THE DRAWINGS

Other features and advantages of the invention will further appear in the description hereinbelow.

In the appended drawings, given by way of nonlimiting examples:

FIGS. 3 and 4 are partial cross sectional views of a series of shaping members;

FIG. 6 is a front view of a surface portion of the second series of members.

DETAILED DESCRIPTION OF THE PREFERRED EMBODIMENTS

Figure 1:
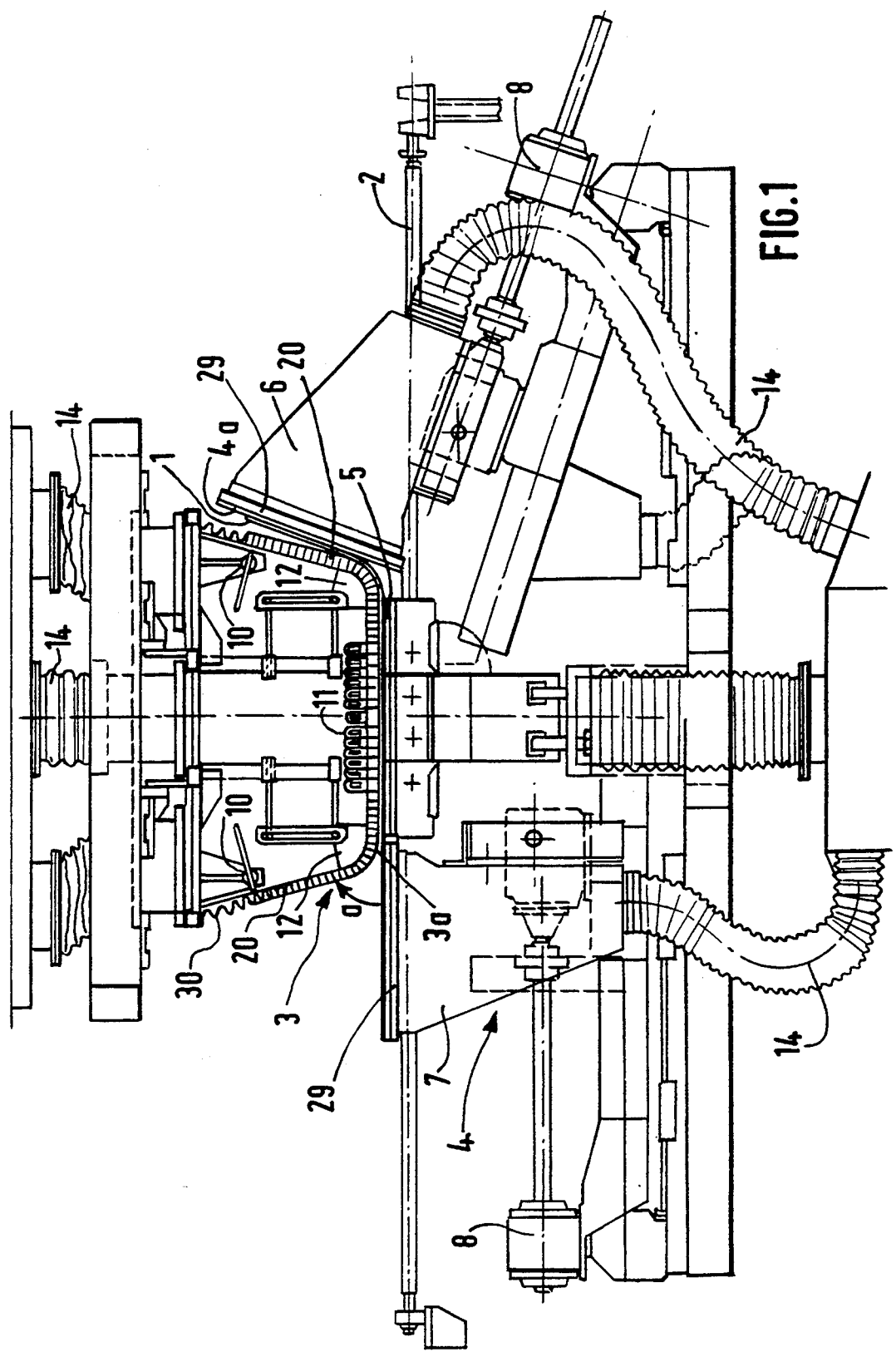
FIG. 1 is a view in elevation of the installation according to the invention.

The modular installation for curving and tempering a glass sheet according to the invention is shown in FIG. 1 in a first embodiment.

This installation comprises means 2 for positioning the heated glass sheet 1 horizontally between two series 3, 4 of shaping members. These means 2 for positioning the glass sheet 1 are, in a known manner, a series of parallel rollers 2 driven in rotation which serve both as support for the glass sheet I and as movement means.

The glass sheet 1 is thus conveyed by these rollers 2, as soon as it leaves an oven located upstream, up to the installation.

These rollers 2 also enable the glass sheet 1, once it is curved and tempered, to leave the installation, preferably on the opposite side from that via which this sheet was inserted into the installation.

The glass sheet 1 is generally heated in an oven to a temperature in the neighborhood of 650° C. Preferably, the oven is arranged so that those parts of the glass sheet 1 which will be highly curved by the shaping member series 3, 4 are heated more.

The installation according to the invention comprises means for applying the shaping member series 3, 4 on either side of the glass sheet 1.

In this exemplary embodiment, a first series 3 of members 20 is located above the glass sheet 1 and is immovable, whereas a second series 4 of members 5, 6, located beneath the glass sheet 1, can be moved vertically toward the first series 3 of members so as to curve the glass sheet 1 between the two series 3, 4 of members.

The installation furthermore comprises members 14 for directing jets of gas onto the glass sheet 1 in order to temper the latter.

This gas is directed under a pressure of 20,000–27,000 Pa by virtue of conduits 14 connected to the shaping member series 3, 4. These conduits 14 are made of flexible material and have a length sufficient to tolerate the movements of the shaping member series 3 and 4.

In accordance with the invention, first adjustment means 10, 11 and 12 enable the profile of the surface 3a exhibited by the first series 3 of members 20 to be modified as a function of the curvature which it is desired to give the glass sheet 1.

The first adjustment means comprise at least one end device 10 suitable for modifying the angle a formed by one end of the surface 3a of the first series 3 of members 20 and a horizontal plane.

As shown in FIG. 1, the installation comprises, on each side, such an adjustment means comprising jacks 10 suitable for moving the end of the surface 3a of said first series 3 of members 20 between a first position, in which it lies substantially horizontal, and a second position, in which it forms an angle a with respect to a horizontal plane.

This angle a may lie between 0° and 90°.

The first adjustment means also comprise at least one curvature device 12 suitable for modifying the radius of curvature of a region of convexity between one end of the surface 3a of the first series 3 of members 20 and a substantially horizontal part of this surface 3a.

This radius of curvature is equal at least to 100 mm, taking into account the overall size of the shaping members 20, as will be explained later.

The adjustment means furthermore comprise a central device 11 suitable for modifying the length of the horizontal part of the surface 3a of the first series 3 of members 20.

As shown in FIGS. 1 to 4, the members 20 of the first series consist of blocks of trapezoidal cross section, the base of said blocks being intended to be applied to the surface of the glass sheet 1.

These blocks extend parallel to each other and are arranged perpendicular to the transverse profile of the surface of the first series 3 of members 20.

These trapezium-shaped blocks have a height of 25 mm.

Preferably, the blocks located at the center of the series 3 of members 20 have a longer base than the blocks located on the sides.

Thus, in this exemplary embodiment, the block 20a located at the center of the tool has a base of 40 mm, the sides of the trapezium forming an angle of 3° with the vertical.

The blocks 20b surrounding this central block 20a typically have a base of 25 mm, the angle formed by the sides of the trapezium and the vertical being equal to 3°.

Finally, the blocks 20c located towards the ends of the first series 3 of members 20 have a base of 17 mm and an angle formed by the sides and the vertical equal to 5°.

The curvature of the profile exhibited by the surface of the first series of members is therefore produced by moving the sides of the adjacent blocks closer together to a greater or lesser extent.

When the sides of the blocks are in contact with each other, the radius of curvature of the profile exhibited by the surface 3a is equal to approximately 100 mm.

The blocks are made of wood and their base is covered with a flexible woven fabric 42. This fabric 42 made of very fine metal wires enables the wood of the blocks to be protected from the heat released by the glass sheet and enables a surface of contact with the sufficiently flexible and smooth glass to be formed in order not to mark the surface of the glass sheet 1.

Elastic means 40 are suitable for connecting at least two adjacent blocks.

Figure 2:
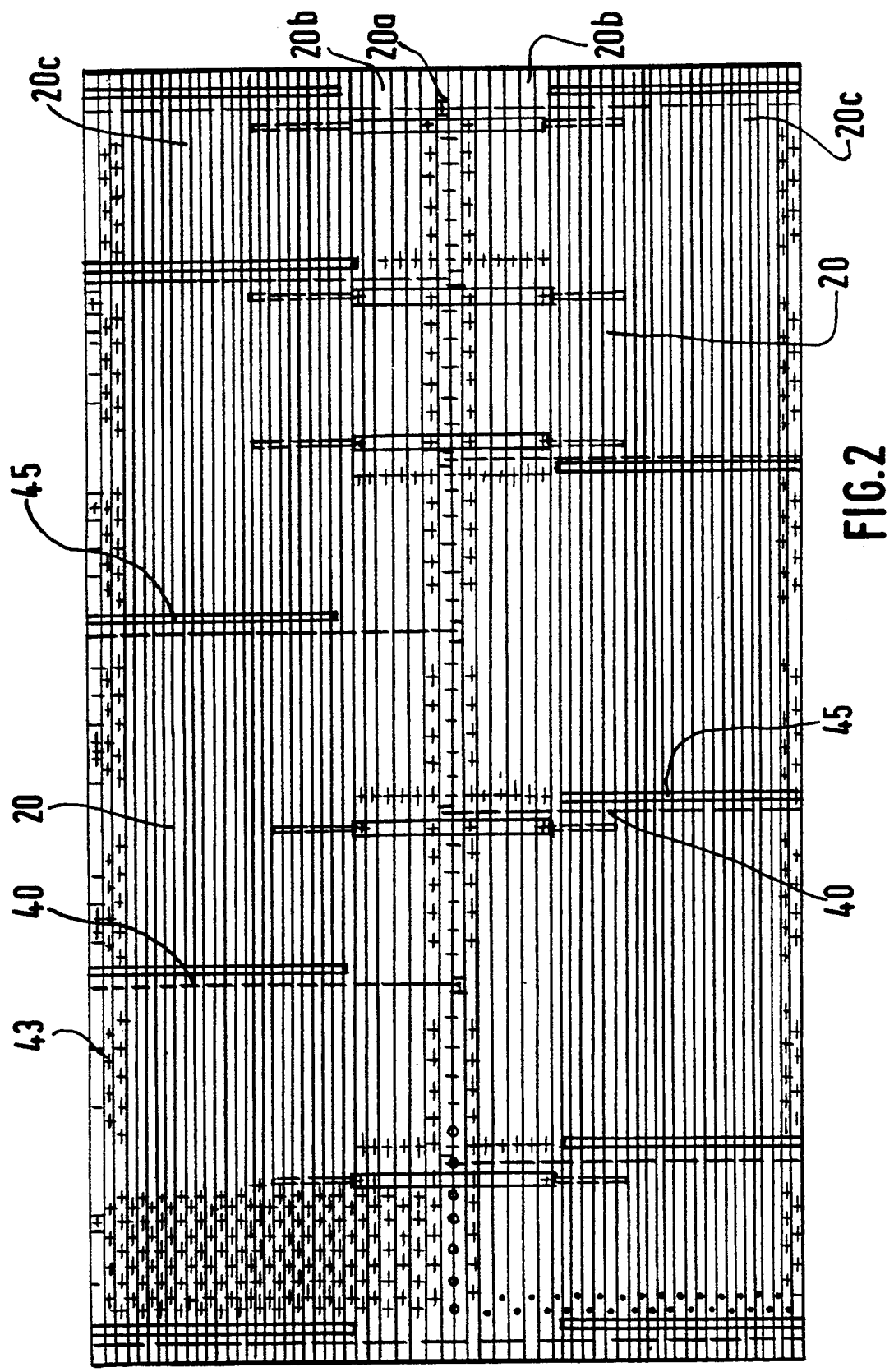
FIG. 2 is a view from below of a series of shaping members.

As shown in FIG. 2, an elastic means 40 is suitable for connecting substantially half the blocks of the first series 3 of members 20.

Thus, the blocks are held in contact by virtue of this elastic force.

As illustrated in FIG. 3, the blocks include a transverse opening 41 emerging onto the lateral faces of each block, the adjacent openings 41 being intended to receive a helical spring 40.

In addition, so as to stiffen the planar parts of the first series 3 of shaping members 20, stiffener means 45 are suitable for connecting the blocks forming a planar surface portion.

Preferably, the blocks include a transverse opening emerging onto the lateral faces of each block, the adjacent openings being aligned and intended to receive a rigid bar 45.

In another embodiment of the invention, the first series 3 of shaping members 20 comprises different adjustment means 11 and 12.

Thus, the curvature device 12 comprises a series of elements 21 arranged so as to bear on blocks of said first series 3 of members 20 on the opposite side of the glass sheet 1, each element 21 being fastened to a threaded rod 23.

Nuts 22 are respectively screwed onto each threaded rod 23 and a mechanism 12 is suitable for driving the threaded bolts 23 in rotation and for arranging the elements 21 along a curve as a function of the curvature which it is desired to give the region of convexity of the surface 30 of the first series 3 of members 20.

Thus, by moving the elements 21 to a greater or lesser extent, the radius of curvature of the region of convexity is modified. These elements 21 bear on the blocks 20 and therefore force the first series 3 of members 20 to follow their curvature.

The entire curvature mechanism 12 may be moved along a vertical axis, shown diagrammatically by an arrow F, and along a horizontal axis, shown diagrammatically by an arrow P, so as to be able to modify the location of the region of convexity along the profile of the first series 3 of members 20.

A series of threaded rods 24 is fastened to the blocks forming a central surface portion of the first series 3 of members 20. These threaded rods 24 are suitable for sliding in a fixed nut 25 and for thus moving the blocks.

Figure 5:
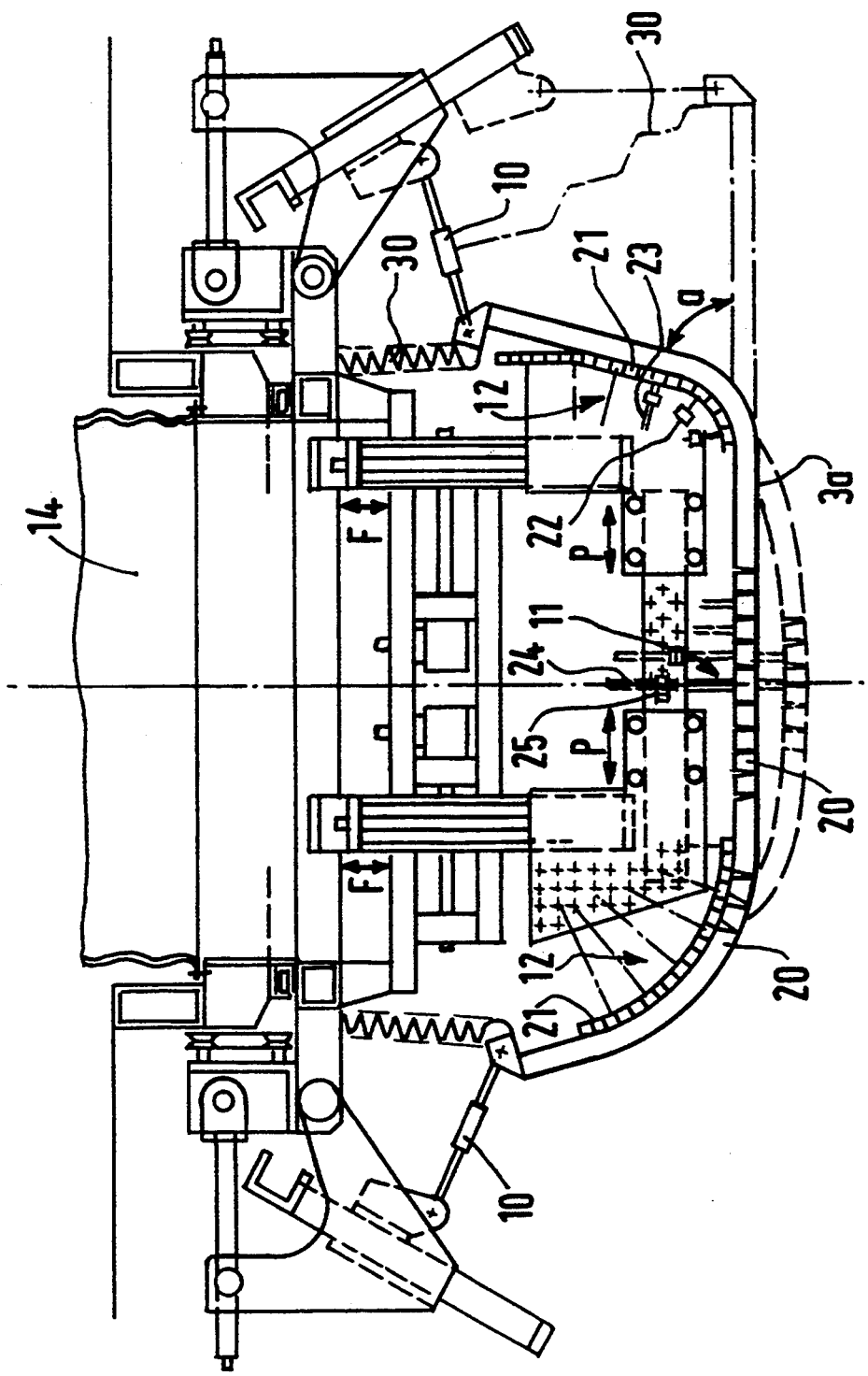
FIG. 5 is a view in elevation of the installation according to a second embodiment of the invention.

As shown by the dashed lines in FIG. 5, the central surface portion may be completely curved, only the central blocks located in the middle of the first series 3 of members 20, being arranged horizontally.

Such a shaping member 20 therefore enables a curved glass sheet to be obtained in the form of a circular arc having an identical radius of curvature for the entire curved glass sheet.

As shown in FIG. 1, the second series 4 of shaping members includes a central surface portion 5 to which two movable parts 6 and 7 are attached.

Movement means in the form of jacks 8 make it possible to control the movement of the movable parts 6 and 7 of the second series 4 of members in a curve parallel to the profile of the surface 3a of the first series 3 of members 20. These movement means in the form of jacks 8 enable the movable parts 6 and 7 to be moved in three directions in space so that these movable parts 6 and 7 may describe any curve, whatever the profile of the first series 3 of shaping members 20.

This movement in three directions of the movable parts 6 and 7 is brought about by virtue of the jacks 8 which may move the movable parts along an axis, these jacks 8 themselves being able to pivot about a horizontal axis and to move parallel to this same axis.

The movement of the movable parts 6 and 7 is controlled by a computer (not shown) which enables the motion of the jacks 8 to be defined as a function of a certain number of parameters, such as the radius of curvature of the region of convexity, the angle a and the length of the central surface portion of the first series 3 of members 20.

Thus, at any moment, the surface 4a of the movable parts 6 and 7 is in linear contact with one of the faces of the glass sheet i and applies the latter against the first series 3 of members 20 without there being any slipping or friction of the glass sheet 1 against the shaping member series 3 and 4.

These movable parts 6 and 7 preferably each consist of a single block 29 and exhibit a planar surface toward the glass sheet 1.

As illustrated in FIG. 6, second adjustment means 50, 51 are suitable for modifying the profile of the central surface portion 5 of the second series 4 of members as a function of the profile of the surface 3a of the first series 3 of members 20 which is located opposite.

The central portion 5 preferably consists of blocks 28 which have a substantially rectangular cross section.

These blocks 28, as well as the blocks 29, are interrupted in line with the rollers 2 suitable for supporting the glass sheet 1.

Thus, the members of the second series 4 may pass between the rollers 2 in order to raise the glass sheet 1 and to apply the latter against the first series 3 of members 20.

The blocks 28 and 29 are also made of wood covered with a flexible woven fabric made of metal wires in order to avoid marking the glass sheet 1.

The blocks 28 forming the central surface portion 5 of the second series 4 of members are fastened to a nut 60 which is screwed onto a threaded rod 51 and is suitable for positioning the blocks 28 along a curve corresponding to the profile of the surface 3a of the first series 3 of members 20 which is located opposite.

The blocks 20, 28 and 29 of the first 3 and second 4 series of members each include a series of orifices 43 emerging at the surface 3a, 4a of the shaping members and connected to the means 14 for directing the jets of gas onto the glass sheet 1 in order to temper the latter.

The orifices 43 of two adjacent blocks of the first series 3 of members 20 are arranged in a staggered configuration as shown in FIG. 2.

Thus, the application of the gas onto the glass sheet 1 is performed uniformly over the entire surface.

As illustrated in FIGS. 1 and 5, the ends of the first series 3 of members 20 are connected in a sealed manner to the support of the installation by means of extensible bellows 30 capable of tolerating the movement of the ends of the first series of members between a horizontal position and a substantially vertical position.

Thus, the gas is applied under pressure to the glass sheet without there being any leak.

The first series 3 of members 20 is preferably mounted on a support which can slide on rails so that the off-line curved profile may be adjusted without being disturbed by the rest of the installation.

Thus, in operation, the curvature profile of the first series 3 of members 20 is adjusted and, next, the central surface portion 5 of the second series of members is adjusted so that it exhibits a surface complementary to that of the first series 3 of members 20 which is located opposite.

Next, the parameters of this curved profile (angle a, radius of curvature, length of the horizontal central part) are re-entered into the computer which controls the jacks 8 for moving the movable parts 6 and 7 of the second series 4 of members.

The glass sheet 1 is heated in an oven, and then inserted into the installation in accordance with the invention.

The motion of the support rollers 2 is stopped and the second series 4 of members is raised vertically toward the first series 3 of members 20.

The glass sheet 1 is raised and applied against the central surface portion of the first series 3 of members 20.

The movable parts 6 and 7 are then moved by the jacks 8 so that the glass sheet 1 is applied without slipping over the entire first series 3 of members 20.

The second series 4 of members is then moved downward and a gas under pressure is blown onto the glass sheet 1 in order to temper the latter.

Next, the glass sheet 1 leaves the installation by virtue of the rollers 2.

Of course, the invention is not limited to the exemplary embodiments described hereinabove, and numerous modifications may be made without departing from the scope of the invention.

Thus, the helical spring 40 for elastically holding the blocks of the first series 3 of members 20 may be replaced by an elastic strap.

The movable parts 6 and 7 of the second series of members may exhibit a curved surface, the convex part of which is directed toward the glass sheet.

I claim:

1. In a modular installation for curving and tempering a heated glass sheet (1), comprising members for shaping the heated glass sheet, means (2) for positioning the heated glass sheet (1) horizontally between said members for shaping the heated glass sheet (1), means for applying the shaping members on either side of the heated glass sheet (1) and for curving the heated glass sheet and means (14) for directing jets of gas onto the heated glass sheet (1) in order to temper the heated glass sheet, the shaping members including a first series (3) of members (20) exhibiting a surface (3a) intended to come into contact with one of the faces of the heated glass sheet (1) and a second series (4) of members exhibiting a surface (4a) intended to come into contact with the other face of the heated glass sheet (1) including a central surface portion (5) to which at least one movable part (6,7) is attached; the improvement which comprises first adjustment means (10,11,12) for modifying the profile of said surface (3a) exhibited by the first series (3) of members (20) as a function of the curvature which it is desired to give the heated glass sheet (1), means (8) for controlling the movement of the movable part (6,7) of the second series (4) of members in a curve parallel to the profile of the surface (3a) of the first series (3) of members (20) and second adjustment means (50,51) suitable for modifying the profile of said central surface portion (5) of the second series (4) of members as a function of the profile of the surface (3a) of said first series (3) of members (20) which is located opposite.

2. The installation as claimed in claim 1, wherein said first adjustment means comprise at least one end device (10) suitable for modifying an angle (a) formed by one end of the surface (3a) of the first series (3) of members (20) and a horizontal plane.

3. The installation as claimed in claim 2, wherein said at least one end device (10) comprises a jack suitable for moving the one end of the surface (3a) of said first series (3) of members (20) between a first position, in which it lies substantially horizontal, and a second position, in which it forms said angle (a) with respect to a horizontal plane.

4. The installation as claimed in claim 1, wherein said first adjustment means comprise a central device (11) suitable for modifying the length of a horizontal part of the surface (3a) of the first series (3) of members (20).

5. The installation as claimed in claim 1, wherein the members (20) of the first series (3) consist of blocks of trapezoidal cross section, the base of said blocks being applied onto the surface of the heated glass sheet (1).

6. The installation as claimed in claim 5, wherein said first adjustment means comprises a series of elements (21) arranged so as to bear on said blocks on the opposite side from the base of the blocks, each element (21) being fastened to a threaded rod (23).

7. The installation as claimed in claim 6, wherein said first adjustment means further comprises nuts (22) screwed respectively onto the threaded rod (23) and a mechanism (12) suitable for driving the threaded rod (23) in rotation and for arranging the elements (21) along a curve as a function of the curvature which it is desired to give a region of convexity of the surface (3a) of said first series (3) of members (20).

8. The installation as claimed in claim 5, wherein said first adjustment means further comprises a series of threaded rods (24) which are fastened to the blocks forming a central surface portion of the first series (3) of members (20) and are suitable for sliding in a fixed nut (25).

9. The installation as claimed in claim 5, wherein the surface of said blocks is covered with a flexible woven fabric (42).

10. The installation as claimed in claim 5, wherein the blocks extend perpendicular to the profile of the surface (3a) of said first series (3) of members (20).

11. The installation as claimed in claim 5, wherein elastic means (40) connects at least two adjacent blocks.

12. The installation as claimed in claim 5, wherein an elastic means (40) connects substantially half the blocks.

13. The installation as claimed in claim 5, wherein the blocks include at least one transverse opening (41) emerging onto the lateral faces of each block, and a helical spring (40) received within adjacent said openings (41).

14. The installation as claimed in claim 5, which further comprises stiffener means (45) for connecting the blocks forming a planar surface portion.

15. The installation as claimed in claim 5, wherein the blocks include at least one transverse opening emerging onto the lateral faces of each block, with adjacent openings in the blocks being aligned, and a rigid bar (45) disposed in a pair of said aligned adjacent openings.

16. The installation as claimed in claim 5, further comprising blocks (28) forming the central surface portion (5) of the second series (4) of members, and nuts (50) screwed onto threaded rods (51), said nuts bearing on said blocks (28) forming the central surface portion for positioning said blocks (28) forming the central surface portion along a curve corresponding to the profile of the surface (3a) of said first series (3) of members (20) which is located opposite.

17. The installation as claimed in claim 5, further comprising blocks forming the central surface portion of the second series of members and wherein the blocks of the first (3) and second (4) series of members each include a series of orifices (43) which emerge at the surface (3a,4a) of the first and second series (3,4) of members and are connected to the means (14) for directing jets of gas onto the heated glass sheet (1) in order to temper the heated glass sheet.

18. The installation as claimed in claim 17, wherein the orifices (43) of two adjacent blocks (20) of the first series (3) of members (20) are arranged in a staggered configuration.

19. The installation as claimed in claim 1, wherein said positioning means (2) comprise rollers that support the heated glass sheet, and wherein the second series (4) of members comprises blocks (28,29) interrupted in line with said rollers (2) that support the heated glass sheet (1).

* * * * *